Patented Aug. 31, 1943

2,328,398

UNITED STATES PATENT OFFICE 2,328,398

COATING COMPOSITION

Stephen J. Roskosky, Flint, Mich., assignor to E. I. du Pont de Nemours & Company, Wilmington, Del., a corporation of Delaware No Drawing. Application October 18, 1940, Serial No. 361,721

4 Claims. (Cl. 174—125)

This invention relates to coating compositions of the kind known to the trade as wire enamels. More specifically the invention relates to electrical insulating compositions comprising polyamides in combination with other modifying materials. It further relates to improvements obtained by combining polyamides with other film forming materials.

The polyamides referred to herein are those described in U. S. Patents 2,071,250, 2,130,523 and 2,130,948 and are commercially known as "nylon." Hereinafter the polyamides will be referred to as nylon.

The unmodified nylon wire enamels are characterized by their excellent abrasion and scrape resistance, toughness, flexibility, and resistance to oil and various solvents. They are, however, at present relatively high in cost. The present invention improves their heat-aging qualities and insulating qualities when wet and at the same time reduces the cost.

This invention has, therefore, as an object new and useful electrical insulating coating compositions characterized by excellent abrasion resistance, flexibility, resistance to oil, varnish and common solvents, improved heat-aging qualities, better insulating properties when wet, and comparatively low cost. Other objects will appear hereinafter.

These objects are accomplished in the following invention by combining nylon with certain other film forming materials, such as alkyd resins, phenol-formaldehyde resins, and oils.

The invention is illustrated by the following examples:

Example I

| | Parts by weight |
|---|---|
| Nylon | 50 |
| Alkyd resin | 17 |
| Phenol-formaldehyde resin | 33 |
| m-p cresol | 200 |
| Crude hi-flash coal tar naphtha | 200 |
| Liquid lead-manganese drier | 1 |

Example II

| | Parts by weight |
|---|---|
| Nylon | 25 |
| Alkyd resin | 25 |
| Phenol-formaldehyde resin | 50 |
| m-p cresol | 100 |
| Crude hi-flash coal tar naphtha | 100 |
| Liquid lead-manganese drier | 1 |

Example III

| | Parts by weight |
|---|---|
| Nylon | 25 |
| Alkyd resin | 37.5 |
| Phenol-formaldehyde resin | 37.5 |
| Thiodiphenylamine | .5 |
| m-p cresol | 100 |
| Crude hi-flash coal tar naptha | 100 |
| Liquid lead-manganese drier | 2 |

Example IV

| | Parts by weight |
|---|---|
| Nylon | 25 |
| Phenol-formaldehyde resin | 37.5 |
| Air blown linseed oil | 37.5 |
| m-p cresol | 100 |
| Crude hi-flash coal tar naphtha | 100 |
| Liquid lead-manganese drier | 2 |

Example V

| | Parts by weight |
|---|---|
| Nylon | 50 |
| Alkyd resin | 25 |
| Rosin | 25 |
| m-p cresol | 200 |
| Crude hi-flash coal tar naphtha | 200 |
| Liquid lead manganese drier | 1 |

The above examples are illustrative of the invention but the invention is not limited to these examples. As the nylon content is increased, the flexibility, toughness, abrasion resistance and solvent resistance are improved, but at the same time the cost is also appreciably increased. I have also found that 25% nylon based on the non-volatile constituents produces an enamel with the desired properties at a reasonable cost. Provided the nylon content is not less than 25% of the total, the ratios between the other non-volatile constituents can be varied over a wide range. My preferred ratios, however, are given in the above examples.

The enamels of this invention can be prepared by first making up individual solutions of the nylon, alkyd resin, phenol-formaldehyde resin and oil and then mixing these solutions together in the proper proportions. Although I prefer to make the enamels by mixing the individual solutions, alternate methods can also be used to advantage to produce the same results. For example, a varnish can be made first by cooking the oil and phenol-formaldehyde resin together or the phenol-formaldehyde resin can be cooked into the alkyd resin by methods well known to those skilled in the art.

The nylon is extremely insoluble in most solvents and is best put into solution by agitation for several hours in hot (150°–350° F.) coal tar acids, such as m-p cresol or phenol. The concentration of nylon should be about 20%. Even a 20% solution is rather viscous. Other solvents such as ethylene chlorhydrin especially in combination with phenols may be used.

The crude hi-flash coal tar naphtha given in the above examples is not an active solvent for the nylon but is used as a diluent to reduce the cost of the enamel. This solvent is used to dissolve the alkyd resin, the phenol-formaldehyde resin and the oil. Other coal tar solvents such as toluol or xylol or hydrogenated petroleum naphtha can be used in place of the crude hi-flash naphtha.

The phenol-formaldehyde resin given in the above examples can be any one of the commercial grades now on the market which are soluble in coal tar acids, coal tar hydrocarbon or hydrogenated petroleum naphtha. Those known as "Amberols" which are rosin modified phenol-formaldehyde resins may also be used. It has been found that the phenol-formaldehyde resins are among the very few materials which are compatible with nylon. The phenol-formaldehyde resin appears to act as a blending agent for the alkyd resin and oil, the latter two materials not being compatible with the nylon when the solvent evaporates from the enamel.

The rosin in Example V functions as a blending agent similar to the phenol-formaldehyde resin. The rosin is cheaper but is less water and solvent resistant than the phenol-formaldehyde resin.

The alkyd resin shown in the above examples is not limited to one composition as I have found that a large number of resins can be used to produce the desired results as can be noted from the following examples:

| Composition | A | B | C | D | E |
|---|---|---|---|---|---|
| Glyceryl phthalate | 60 | 60 | 38 | 50 | 65 |
| Linseed oil | 35 | 40 | | 34 | |
| China wood oil | | | 42 | 16 | |
| Perilla oil | | | | | 35 |
| Rosin | | 5 | 20 | | |

The alkyd resins used in my invention can be manufactured by methods well known to those skilled in the art.

The thiodiphenylamine is used in my invention to improve the heat-aging properties of the nylon, but it is not vital to the process of the invention.

Sufficient lead-manganese or other drier in the liquid form is added to the enamel to aid in the oxidation of the oil in the enamel. Based on the oil content, .2% lead and .05% manganese have been found satisfactory.

The enamels of my invention can be applied to copper wire by the two methods well known to the industry. Either the flowing characteristics of the enamel can be adjusted by the addition of the solvent, the amount being dependent on the speed of the enamelling machine and the size of the wire being coated, or dies can be put on the wire to wipe off the excess enamel. The latter method is used when the enamel is high in viscosity and low in non-volatile constituents.

After a coating of enamel is applied to the wire it can be baked in the regular ovens in common use in the industry. Temperatures ranging from 500° F. to 700° F. or even 800° F. can be used depending on the speed of the machine and the length of the oven. A bake of 15 to 20 seconds at 525° F. is sufficient to obtain the desired properties with the enamels of my invention.

In the examples the invention has been illustrated by the use of m-p cresol as a portion of the solvent. It is to be understood, however, that this can be replaced by coal tar acids or by material known in the art as petroleum cresylic acids. Also other ingredients may be added such as plasticizers, for example those mentioned in application Serial No. 221,262, filed July 25, 1938. Likewise, pigments, dyes, and other coloring matter may be added to the composition provided the insulating properties are not unduly affected thereby.

It will also be apparent that the invention is not limited to the application of compositions herein disclosed directly to the wire, but may be used for coating wire which has previously been wrapped with regenerated cellulose, cotton, silk, or treated with any other coating. The wrapping may be put on before or after the composition herein disclosed is applied. It will also be apparent that any number of coats may be put on the wire to get the desired build. This may be accomplished by adjusting the rate of passing the wire through the composition and the viscosity of the composition as influenced by temperature or solvents.

In Example IV the air blown linseed oil may be replaced by an equal amount of any oxidized oil having drying properties.

The particular solvent such as phenol does not in itself constitute part of this invention since other coal tar acids including cresols and the like may be used. It is also to be understood that during the baking process the volatile portion of the composition; that is, the cresols, naphtha, phenols, and the like, are completely evaporated leaving only the solids of the solution as the coating on the wire. The baking period of 15 to 20 seconds at 520° F. appears to be sufficient to eliminate substantially all of the cresol; at least the wire after so treated does not retain any odor of this material.

It is apparent that many widely different embodiments of this invention may be made without departing from the spirit and scope thereof, and therefore, it is not intended to be limited except as indicated in the appended claims.

I claim:

1. A wire enamel comprising at least 25 per cent of a polyamide based on the non-volatile constituents of the enamel, said polyamide being the reaction product of a polymer-forming composition comprising reacting materials selected from at least one of the class consisting of polymerizable monoaminomonocarboxylic acids, and mixtures of diamine and dibasic carboxylic acids, the remainder being a mixture of an alkyd resin and a phenol-aldehyde resin, each of the latter two ingredients being present in substantial amount.

2. A wire enamel, the non-volatile components of which comprise about 1 part of a polyamide, said polyamide being the reaction product of a polymer-forming composition comprising reacting materials selected from at least one of the class consisting of polymerizable monoaminomonocarboxylic acids, and mixtures of diamine and dibasic carboxylic acids, the remainder being a mixture of about 1 part of an alkyd resin and about 2 parts of a phenol-aldehyde resin.

3. An electrical conductor having at least one coating thereon of the composition of claim 1.

4. An electrical conductor having at least one coating thereon of the composition of claim 2.

STEPHEN J. ROSKOSKY.

CERTIFICATE OF CORRECTION.

Patent No. 2,328,398. August 31, 1943.

STEPHEN J. ROSKOSKY.

It is hereby certified that error appears in the printed specification of the above numbered patent requiring correction as follows: Page 2, first column, line 38, for "process" read --success--; and that the said Letters Patent should be read with this correction therein that the same may conform to the record of the case in the Patent Office.

Signed and sealed this 19th day of October, A. D. 1943.

(Seal)

Henry Van Arsdale,
Acting Commissioner of Patents.